Jan. 6, 1925.

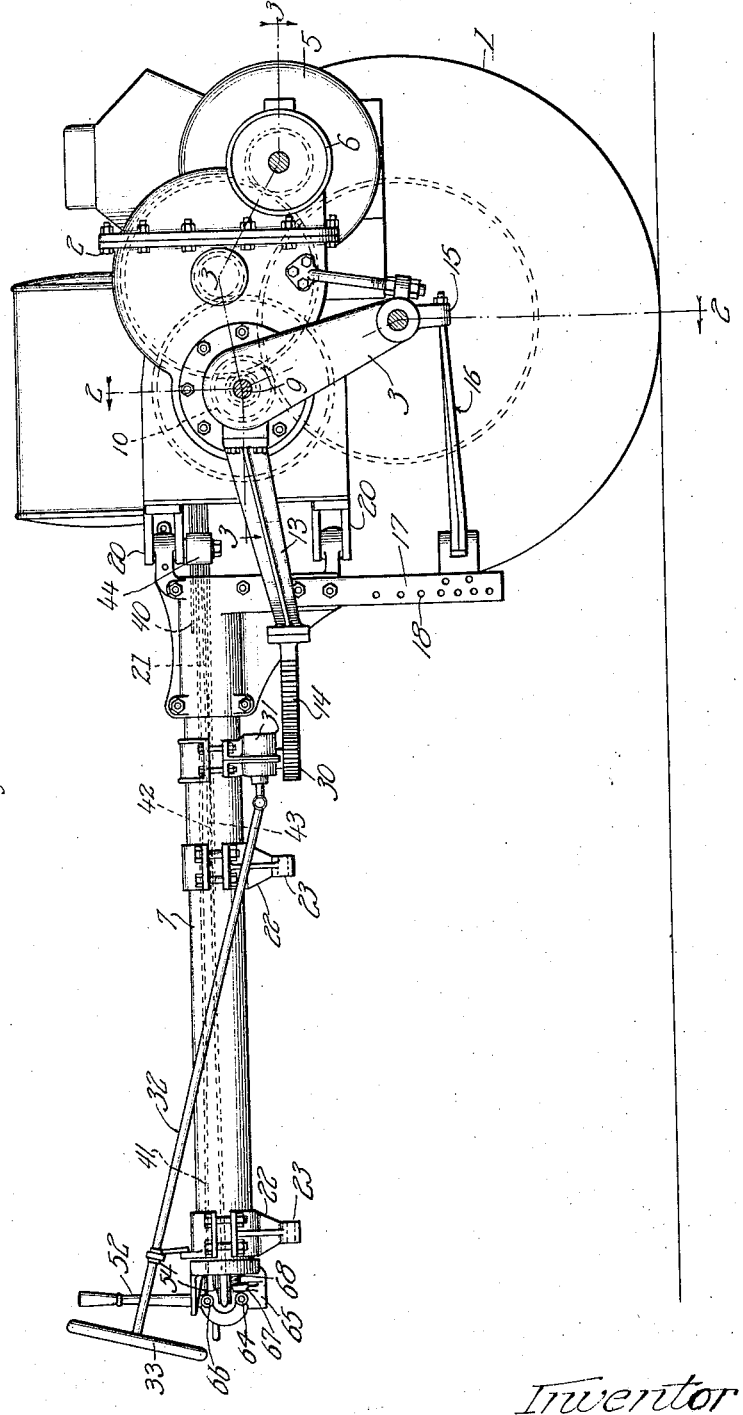

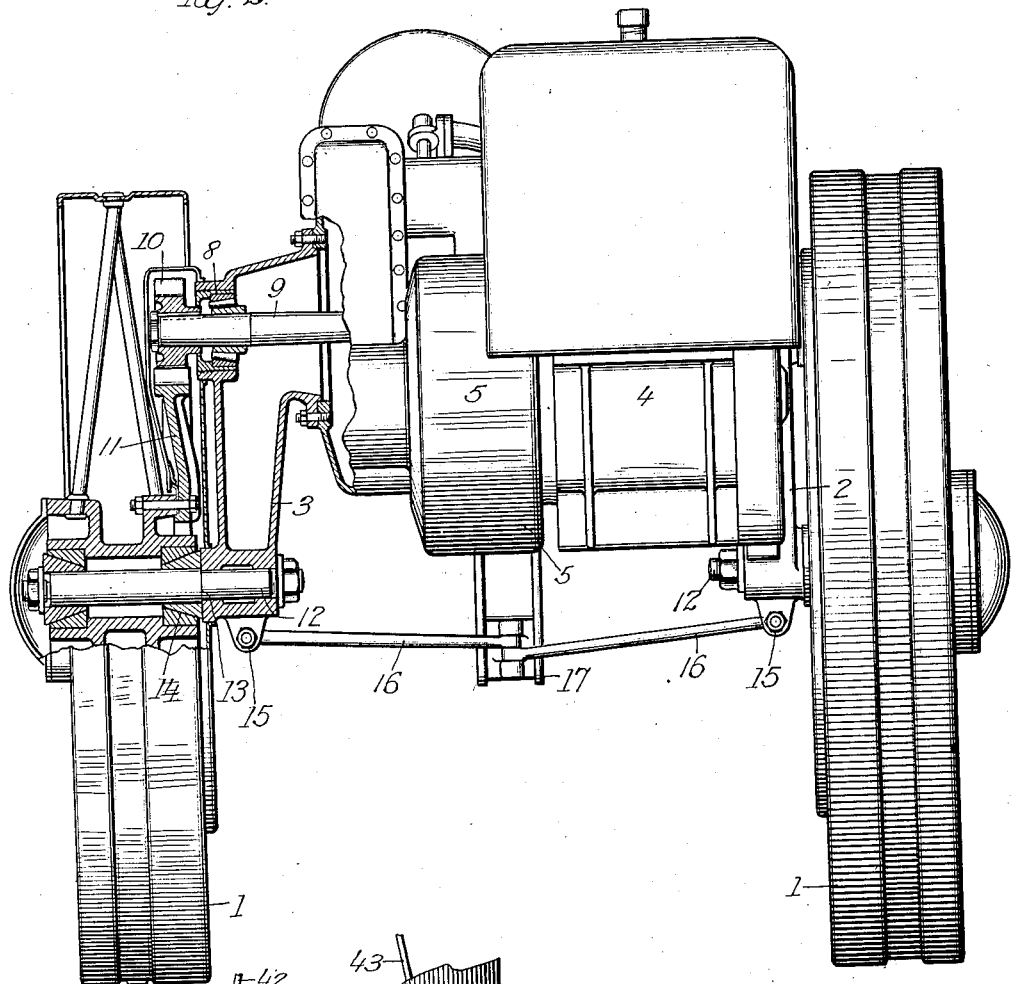

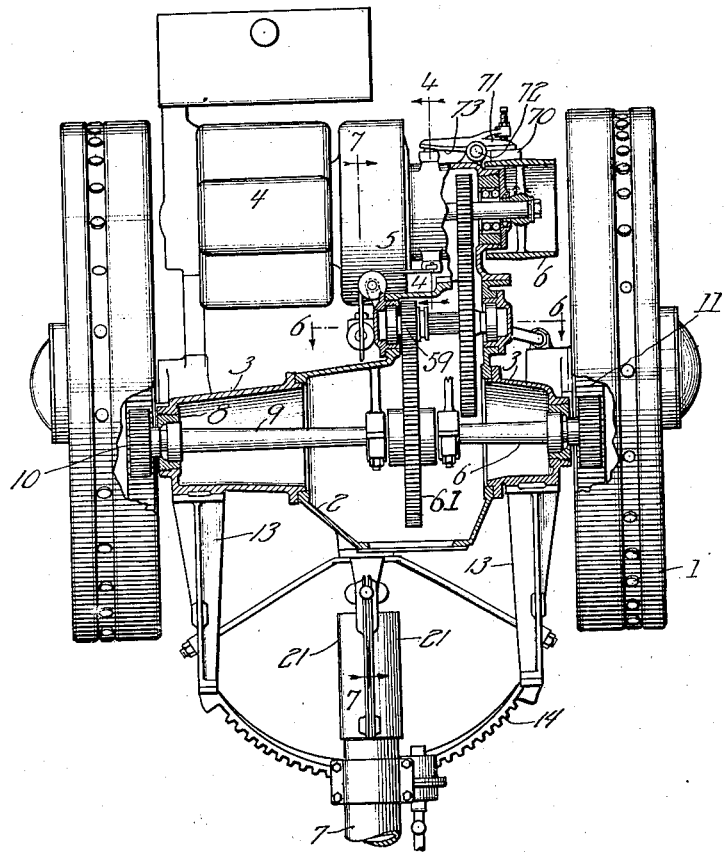

W. M. MANSFIELD

TRACTOR

Filed Aug. 12, 1920

Inventor
Warren M. Mansfield

Patented Jan. 6, 1925.

1,521,696

UNITED STATES PATENT OFFICE.

WARREN M. MANSFIELD, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR.

Application filed August 12, 1920. Serial No. 402,950.

*To all whom it may concern:*

Be it known that I, WARREN M. MANSFIELD, a citizen of the United States, residing at Moline, county of Rock Island, State of Illinois, have invented certain new and useful Improvements in Tractors, of which the following is a specification.

The invention relates to tractors.

It is more particularly directed to two wheel tractors of the unstable type.

Two wheel tractors generally include a main frame supporting a power plant and a trailing coupling frame or reach that is arranged to be attached to a variety of devices to be drawn. It is necessary that the frame be relatively high above the ground in order that it may clear growing crops. In order to so locate the frame, it is necessary to support it by arms extending upwardly from the axles of the tractor drive wheels because, otherwise, the diameter of the wheels would have to be made undesirably large. The problem in constructing tractors of this type is to make them as simple and inexpensive as possible without sacrificing sturdiness and durability. The tractors are subjected to severe conditions in practical operation and must perform a multitude of functions. They must be relatively flexible and at the same time strong and durable.

The general object of the present invention is to provide an improved and simplified tractor.

A more specific object is to provide a two wheel tractor in which the frame is made of a minimum number of parts which serve a maximum number of purposes.

Another object of the invention is to provide improved controlling mechanism for a two wheel tractor.

A further object is to provide a combination structure in which the power plant may be readily removed as a unit and used for other purposes.

Other objects and advantages of the construction will appear from the specification and drawings.

The preferred construction is shown in the drawings in which,

Figure 1 is a side elevation of the tractor.

Figure 2 is a front elevation, partly in section on the line 2—2 of Figure 1.

Figure 3 is a section on the line 3—3 of Figure 1.

Figure 4 is a section on the line 4—4 of Figure 3.

Figure 5 is a front detailed view showing the brake.

Figure 8 is a plan view of portions of the controlling mechanism.

Figure 6:
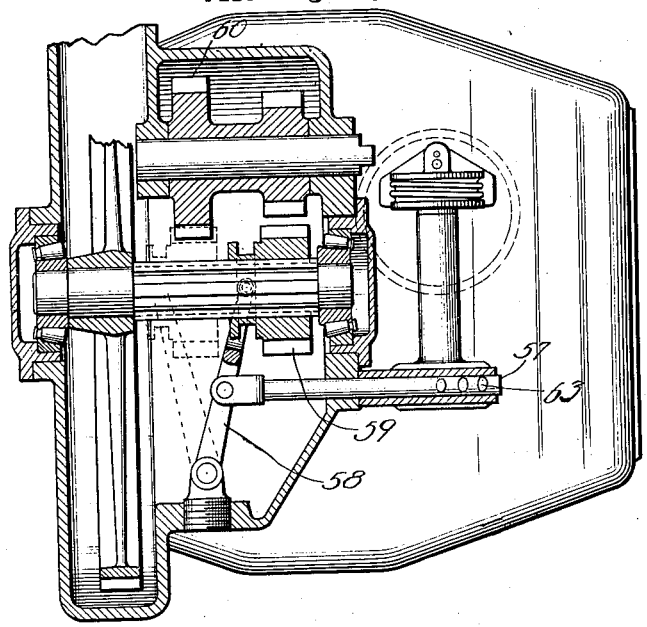
Figure 6 is a section on the line 6—6 of Figure 3.

The tractor includes two drive wheels 1, a combination frame and housing including a main portion 2 and two arm members 3, a power unit including a motor 4 a clutch device 5 and a pulley 6, and a coupling means pivoted to the tractor to swing about a vertical axis, said means including a hollow tube 7 supporting the controls and extending rearwardly for connection to various devices that are to be drawn.

The improved combination housing and frame is made of a minimum number of parts that perform a maximum number of functions. The main portion 2 forms what may be called the main part of a tractor frame and also serves to enclose the driving mechanism. The main portion of the frame as well as the power unit must be supported relatively high above the ground and in order to accomplish this, the arms 3 have been provided which are hollow and which serve to support bearings 8 of the jack shaft 9 connected to the driving pinions 10 that mesh with the bull gears 11 of the tractor drive wheels. The arms are suitably journaled on extensions of the axles 12 of the drive wheels. These arms may be formed integral with the main housing if desired but for purposes of production, it is preferable to make them separate. In addition to serving as part of the frame and a support for the main housing as well as a support for the jack shaft bearings, these arms have attached to them brackets 13 supporting a steering sector 14 at the rear of the tractor and they are also provided with extensions 15 to which are connected draft rods 16 pivoted to the draft bar 17 which is provided with holes 18 for the reception of connecting means for transmitting the draft to low draft devices that are to be drawn by the tractor.

The power unit which includes the engine 4, the clutch mechanism 5 and the pulley 6 is arranged to be bolted to the forward portion of the main housing 2. The power unit may be readily disconnected by simply removing the bolts that attach it to the main housing after which it may be used as a stationary engine since the unit includes the necessary mechanism, namely engine clutch, and pulley. The method of fastening the power unit to the housing may be varied to suit the requirements, the attaching means shown being bolts which can be easily removed but it is to be understood that any equivalent mechanical means may be substituted.

By means of the construction above described the construction of tractors of this type is greatly simplified and improved. The main housing forms an enclosure for the driving mechanism and constitutes the main part of the frame of the tractor. The driving means or power plant is attached to the forward portion of the tractor as a unit and in such a manner that it may be readily disconnected. The arms which support the main housing also support bearings for the jack shaft and are constructed so that the draft rods as well as the supporting brackets for the steering sector may be easily attached thereto.

The hollow tube 7 of the coupling frame is pivoted to brackets 20 attached to the main frame by means of two sheet metal yoke members 21 bolted together so that they clamp the hollow tube 7 and spherical bearings carried in the brackets 20. This is a simple and efficient construction that permits the coupling frame to swing about a substantially vertical axis relative to the tractor. The tube 7 carries two brackets 22 bolted to it and by means of these, the coupling frame can be attached to various devices that are to be drawn. These brackets are provided with holes 23 for the reception of bolts or pins on the device that is to be drawn, the arrangement being such that the connection may be free to swing about a substantially horizontal axis to permit the drawn device to adapt itself to irregularities in the surface of the ground. The brackets 20 are not primarily for the purpose of transmitting the draft but more to stabilize the tractor and permit it to be readily connected to a wide variety of implements, the draft being carried in such cases by the draft members 17. A certain amount of longitudinal movement should be provided for in connecting a device that is to be drawn to the brackets 20. However, when a high draft device is to be connected, it may be desirable to transmit the draft through the brackets, the construction being rigid enough for that purpose.

The steering mechanism includes a steering pinion 30 operated by worm mechanism enclosed in a housing 31 bolted to the tube 7. The steering mechanism is operated through the shaft 32 by means of the steering wheel 33 supported at the rear of the tube 7.

The control connections include flexible cables 40, 41, 42 and 43 manipulated by levers at the rear of the hollow tube and passing through the tube about pulleys 44 and forward to various devices to be controlled. The control connections are thus out of sight and are flexible to permit the coupling frame to be swung about the tractor without disturbing the controls.

Figure 7:
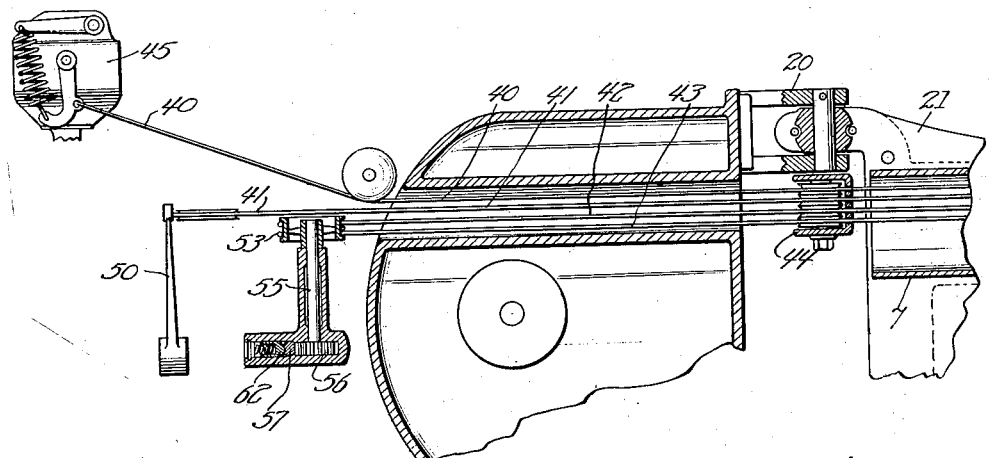
Figure 7 is a section on the line 7—7 of Figure 3.

The throttle is controlled by cable 40 which extends forward to the throttle 45 as shown in Figure 7 and is manipulated by means of a lever 46 at the rear of the coupling frame. This lever is held against forward movement by a spring pressed detent 47, but the lever is swiveled so that it may be turned on its own axis to disengage it from the detent and move it forward.

The clutch is controlled by cable 41 which is connected to a lever 50 fixed to a shaft carrying a shifting yoke 51. The cable is manipulated by means of the lever 52 supported at the rear of the coupling frame. The clutch is normally biased to "in" position and consequently the cable control is used merely for pulling the clutch out, such operation being accomplished by pulling backward on the lever 52.

The gear shift is controlled by cables 42 and 43 which are also manipulated by means of lever 52. These cables are wound about a forward pulley 53 and about a rear pulley 54. Rotation of pulley 54, causes rotation of pulley 53, the construction being such that the pulley 53 may be rotated in either direction to operate the gear shift as illustrated in Figures 6 and 7. Rotation of the pulley 53 rotates the shaft 55 carrying the gear 56 with which meshes a rack 57 whose reciprocation shifts the lever or yoke 58 that in turn shifts the gear 59 in engagement with either the gear 60 or 61 for reverse or forward driving of the tractor. The three positions of the gear shift may be determined by means of a releasable latch or detent comprising a member 62 spring pressed into engagement with the rack and arranged to enter notches 63 in the rack when the gear shift is in its various positions. In this manner the operator may determine by the feel of the controls when he has shifted the gears to the desired position.

The lever 52 is arranged so that it may be used to both control the clutch and shift the gears It is pivoted at the point 64 to a swiveled head 65. The cable 41 for controlling the clutch is attached at the point 66. The lever may be pulled backward and permitted to move forward to operate the clutch. The swiveled head 65 permits the lever to be swung to the right and left and this movement is communicated to the pulley 54 by means of bevel gear sectors 67 and 68. In order to assure that the gears will not be shifted when the clutch is "in", a notched plate 69 is provided with which the lever cooperates. Three positions for the lever are illustrated. To shift from one to the other, it is necessary to pull the lever back, thereby disengaging the clutch, after which the lever may be moved to the right or left from the neutral position to shift the gears. The lever may then be permitted to move forward to engage the clutch. Movement of the lever 52 to the right or left does not affect the clutch control because the movement is not great and because of the flexibility of the cable together with its length.

A brake mechanism is also provided for stopping the rotation of the spinning parts when the clutch is thrown out. This brake mechanism includes a brake shoe 70 cooperating with the surface of the belt pulley 6. The shoe is carried by a lever 71 pivoted at 72 to the housing of the power unit. One end of this lever has a cam face 73 with which cooperates a cam roller 74 carried by a crank 75 attached to the shaft controlled by the crank 50 that operates the clutch. The shape of the cam face on the lever is such that as the clutch is pulled out, the cam roller 74 pushes the arm 71 outwardly causing the brake shoe to engage the belt pulley. When the clutch is let in the brake is released and is biased to an inoperative position by means of a spring 76 illustrated in Figure 5.

It is to be understood that the construction shown is for purposes of illustration only and that numerous variations may be made therein without departing from the spirit and scope of the appended claims.

What I claim is:

1. A front wheel drive tractor having drive wheels, driving mechanism, a combination housing and frame enclosing the driving mechanism and serving as a tractor frame, and a power unit attached to the forward side of the frame so that it may be readily detached for other uses without disturbing the tractor mechanism, said power unit including an engine, a clutch mechanism and a pulley associated with one another so that, when the power unit is detached, it forms a compact unit capable of ready use for stationary power purposes.

2. A tractor having a power plant, driving mechanism including a clutch, a pulley for belt work, a brake cooperating with the pulley, and means arranged so that when the clutch is disconnected the brake is applied to the pulley.

3. A front wheel drive tractor having a power plant, driving mechanism, a belt pulley, a brake for the belt pulley, a clutch between the power plant and the driving mechanism, and means for engaging and disengaging the clutch serving to also automatically apply the brake to stop rotation of the belt pulley and thereby stop rotation of the driving mechanism.

4. A two wheel tractor having a power plant, driving mechanism including a clutch, a pulley for belt work, a brake for the pulley and flexible control connections for the clutch arranged so that when the clutch is disconnected, the brake is applied to the pulley to stop rotation of the driven parts of the tractor.

5. A controlling mechanism for front wheel drive tractors comprising a plurality of flexible cables extending forward to the tractor and connected to mechanisms thereon which are to be controlled, a single control lever movable in two planes, said lever being connected to the flexible controls so that the movement of the lever in one plane operates certain of the controls without moving the others, connections between the lever and the other controls so that movement of the lever in the second plane operates the second set of controls without disturbing the first, and means for insuring that the lever will be moved in only one plane at a time.

In testimony whereof, I affix my signature.

WARREN M. MANSFIELD.